Figure 1:
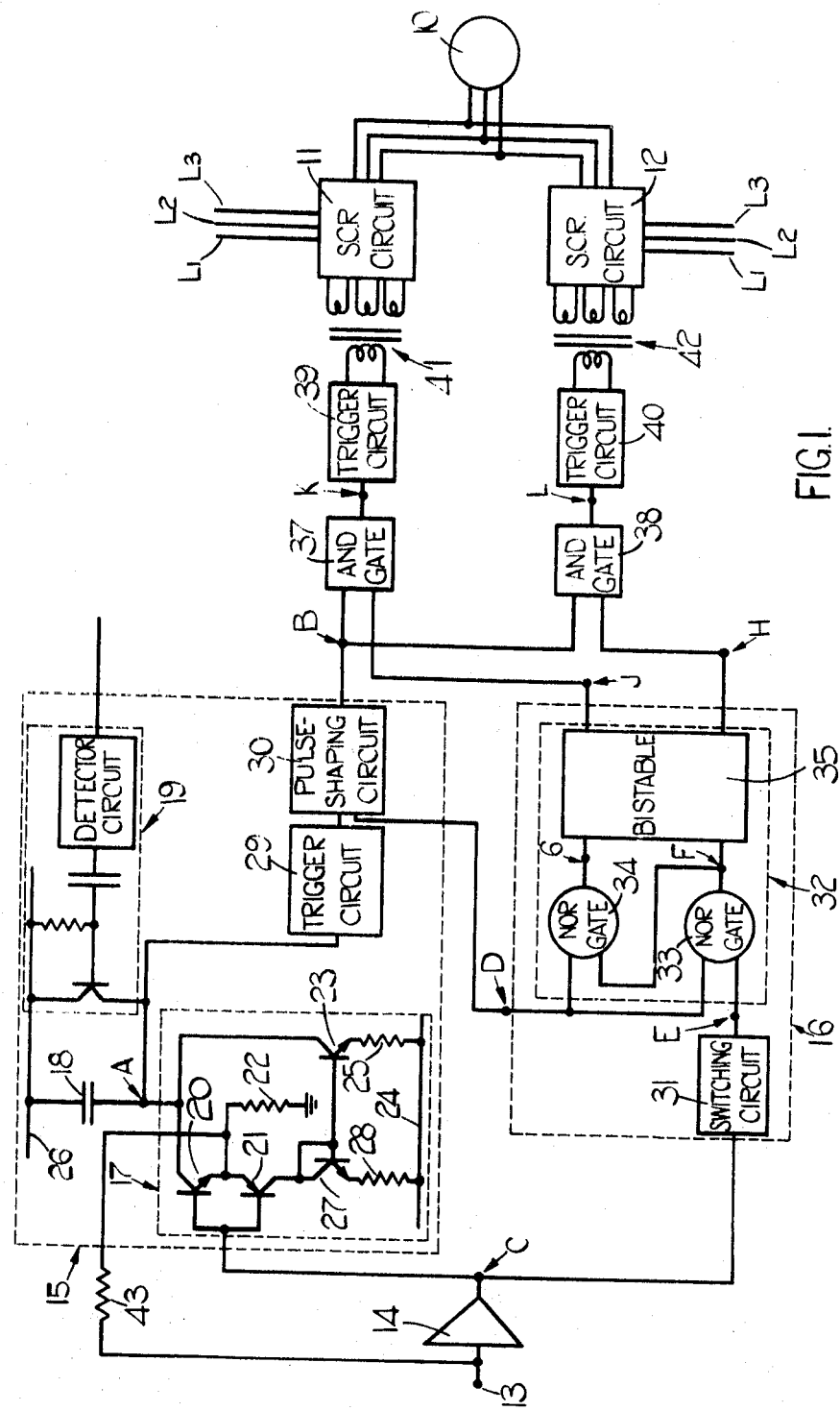

United States Patent

[11] 3,593,079

[72] Inventor Anthony Brian Plant
  Birmingham, England
[21] Appl. No. 852,552
[22] Filed Aug. 25, 1969
[45] Patented July 13, 1971
[73] Assignee Joseph Lucas (Industries) Limited
  Birmingham, England

[54] POLYPHASE ELECTRIC MOTOR CONTROL SYSTEM FOR SPEED AND DIRECTION OF ROTATION
10 Claims, 2 Drawing Figs.

[52] U.S. Cl. ............................................. 318/202, 318/207, 318/227
[51] Int. Cl. .............................................. H02p 3/20
[50] Field of Search ................................. 318/202, 207, 227

[56] References Cited
UNITED STATES PATENTS
| | | | |
|---|---|---|---|
| 3,171,073 | 2/1965 | Adams | 318/207 |
| 3,181,046 | 4/1965 | Sutton | 318/207 X |
| 3,183,425 | 5/1965 | Slawson | 318/227 |
| 3,237,070 | 2/1966 | Inaba et al. | 318/227 X |
| 3,252,067 | 5/1966 | Derenbecher, Jr. | 318/227 X |

Primary Examiner—Benjamin Dobeck
Assistant Examiner—Gene Z. Rubinson
Attorney—Holman & Stern ABSTRACT: The invention relates to a system for controlling the speed and direction of rotation of a polyphase AC motor in accordance with the magnitude and polarity respectively of an input signal. The input signal is fed to a firing circuit which is also controlled by the voltage in one of the phase lines of the motor supply. The firing circuit produces a train of square pulses of constant width and whose phase relationship with the voltages in the motor supply phase lines is dependent on the magnitude only of the input signal. The input signal is also fed to a direction sensing circuit which produces a direction signal in one of two lines depending on the polarity only of the input signal. The pulse train is gated by the presence or otherwise of the direction signal to one of two sets of semiconductor controlled rectifiers which control the current in the phase lines of the motor supply for forward and reverse rotation respectively. The speed of this rotation is dependent in a known manner on the aforesaid phase relationship.

POLYPHASE ELECTRIC MOTOR CONTROL SYSTEM FOR SPEED AND DIRECTION OF ROTATION

This invention relates to an electric motor control system for controlling a polyphase AC motor, and of the kind comprising a plurality of semiconductor controlled rectifiers controlling the flow of current to the respective phase terminals of the motor, and a firing circuit arranged to vary the firing angle of the semiconductor controlled rectifiers in accordance with the magnitude of an input signal.

In control systems of this kind where forward and reverse running of the motor is required it is customary to have two complete control systems, one for forward running and one for reverse running. This is, however, somewhat expensive and it is an object of the present invention to provide a convenient form of control system providing for forward and reverse running of the motor without complete duplication of the control system.

A control system in accordance with the present invention comprises two sets of semiconductor controlled rectifiers, a single firing circuit adapted to produce firing pulses the phase relationship of which to the motor supply is determined by the magnitude of an input signal to the firing circuit, a pair of gate circuits associated respectively with the two sets of semiconductor controlled rectifiers and a polarity detection circuit sensitive to the polarity of the input signal and connected to said gate circuits to permit the output of the firing circuit to pass to one set of semiconductor controlled rectifiers for one polarity of the input signal and to the other set of semiconductor controlled rectifiers for the opposite polarity of the input signal, for forward and reverse running of the motor respectively.

Figure 2:
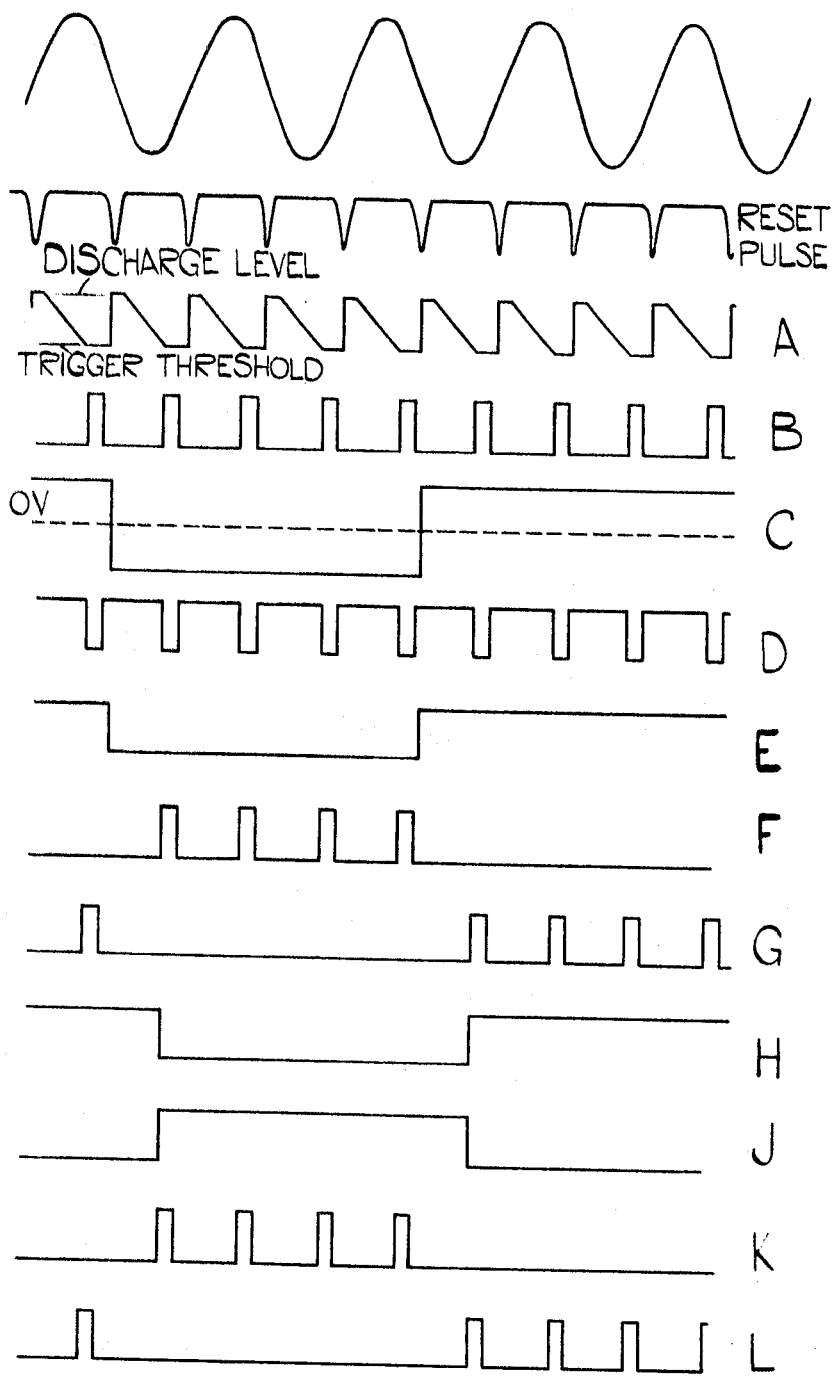

An example of the invention is illustrated in the accompanying drawings in which FIG. 1 is a block diagram of the circuit of the system and FIG. 2 is a graphical representation of the voltage waveforms at various points in the circuit of FIG. 1.

Referring to the drawings the AC induction motor 10 has its phase terminals connected to two sets of semiconductor controlled rectifiers 11, 12 which control the flow of current from the phase lines L1, L2 and L3 for driving the motor 10 in clockwise and anticlockwise directions respectively. The two semiconductor controlled rectifier circuits 11, 12 are well known in the art.

It is required to drive the motor at a speed determined by the input signal at a terminal 13 and to select the direction of drive in accordance with the polarity of the signal at terminal 13. To this end there is provided a DC amplifier 14 the output of which appears at point C and is fed both to a firing circuit 15 and to a polarity detection circuit 16. The firing circuit 15 includes a circuit 17 which varies the current available to charge a capacitor 18 in accordance with the magnitude of the output of the amplifier 14, irrespective of the polarity of the said output.

Connected across the capacitor 18 is a resetting circuit 19 which operates to discharge the capacitor 18 at the end of each half cycle of the supply in one of the phase lines.

The circuit 17 includes an NPN transistor 20 and a PNP transistor 21 having their bases commonly connected to the output of the amplifier 14 and their emitters commonly connected to earth via a resistor 22. The collector of the transistor 20 is connected to one side of the capacitor 18 and also to the collector of an NPN transistor 23 whose emitter is connected to a negative DC rail 24 via a resistor 25. The other side of the capacitor 18 is connected to a positive DC rail 26. The collector of the transistor 21 is connected to the collector of an NPN transistor 27 whose emitter is connected via a resistor 28 to the DC rail 24. The bases of the transistors 23, 27 are connected to each other and to the collector of transistor 27. A feedback resistor 43 is connected between the emitters of the transistors 20, 21 and the input of the amplifier 14.

The sawtooth voltage signal appearing at the point A provides the input to a known type of trigger circuit 29 which fires at a predetermined voltage of the negative-going sawtooth and generates a positive-going square pulse whose leading edge is coincident with the arrival of the sawtooth at the said predetermined voltage. The output of the trigger circuit 29 is supplied to a known type of pulse-shaping circuit 30 which generates at the point 'B' a train of pulses of constant width initiated by the leading edges of the pulses emitted by the trigger circuit 29.

The current source 17, capacitor 18, resetting circuit 19, trigger circuit 29 and pulse-shaping circuit 30 together form the firing circuit 15.

The polarity detection circuit 16 includes a switching circuit 31 of known form which produces an output at point E when the input signal at point C is of one polarity, and no output when the input signal is of the opposite polarity. The circuit 16 also includes a direction logic circuit 32 comprising a pair of NOR gates 33, 34 and a bistable element 35. The inputs to gate 33, at points D and E, are respectively a pulse train from the shaping circuit 30 and the output of the switching circuit 31. The respective inputs of gate 34 are the pulse train at point D and the output of gate 33. The inputs of the bistable element 35 are the outputs of gates 33, 34 at points F and G respectively.

The bistable element 35 operates to convert the pulse train at either one of the points F and G into a corresponding voltage at point H or J. The voltage levels at points H and J reciprocate in accordance with the polarity of the voltage at point C. Change of state of the voltages at points H and J is however delayed by a time equal to the interval between the pulses at point D.

Points J and H are connected respectively to AND gates 37, 38, into each of which is also supplied the shaped pulse train at point B. The pulse train at point B thus appears at the output K or L of whichever of the associated gates 37, 38 also has an input from the bistable element.

A pair of trigger circuits 39, 40 receive their inputs from the respective gates 37, 38 and are coupled to the respective SCR circuits 11, 12 by transformers 41, 42.

The amplifier 14 inverts the signal at the terminal 13. The operation of the circuit 17 is that the transistor 20 becomes more or less conductive in accordance with the bias applied by a positive output from the DC amplifier 14, and the capacitor 18 charges at a rate depending on the current flowing through the transistor 20 and resistor 22 to earth. When the amplifier 14 has a negative output the transistor 21 conducts and a potential appears on the bases of the transistors 23, 27 and also on the collector of transistor 27. Transistors 23 and 27 therefore conduct. Thereafter the voltage on the bases of transistors 23, 27 moves towards or away from earth potential as transistor 21 becomes more or less conductive in accordance with the negative bias from the amplifier 14. The charging rate of capacitor 18 depends in these circumstances on the current flowing through the transistor 23 and resistor 25 to the negative rail 24, and thus on the negative output of the amplifier 14.

At the end of each half cycle of the voltage in one of the phase lines the voltage on the base of the transistor in the resetting circuit 19 falls below that of the positive rail 26 and the transistor conducts, discharging the capacitor 18 and resetting the voltage at point A to that of the rail 26 to produce a negative-going sawtooth waveform.

Variation of the rate of charge of the capacitor 18 varies the time after each said half cycle at which the voltage at point A reaches a sufficient value to operate the trigger circuit 29. Since the pulses produced by the circuit 30 are initiated by the leading edges of the pulses from the circuit 29, the pulses gated to the trigger circuits 39, 40 will have a phase-relationship, or firing angle, with respect to the voltages in the lines L1, L2, L3 which depends on the magnitude of the output of the amplifier 14. The current supplied to the motor 10 by the SCR sets 11, 12 varies in a known manner in accordance with the said firing angle. The delay imposed by the direction logic circuit 32 on the change of state of the signals at points H and J ensures that one of the SCR sets 11, 12 will not be fired while the other of the SCR sets is still firing.

Having thus described my invention what I claim as new and desire to secure by Letters Patent is:

1. An electric motor control system which comprises two sets of semiconductor controlled rectifiers, a single firing circuit adapted to produce firing pulses the phase relationship of which to the motor supply is determined by the magnitude of an input signal to the firing circuit, a pair of gate circuits associated respectively with the two sets of semiconductor controlled rectifiers a polarity detection circuit including a switching circuit which has an output signal when the said input signal is of one polarity only and electronic logic means for supplying a signal to either one of said gate circuits in accordance with the output of said switching circuit to permit the output of the firing circuit to pass to one set of semiconductor controlled rectifiers for one polarity of the input signal and to the other set of semiconductor controlled rectifiers for the opposite polarity of the input signal, for forward and reverse running of the motor respectively.

2. A system as claimed in claim 1 in which the said firing circuit includes a capacitor, means for charging the capacitor at a rate variable with the magnitude of the said input signal, means for discharging the capacitor when the voltage on one phase of the motor supply is at a predetermined level, and means for converting the signal across the capacitor into a pulse train of a required form.

3. A system as claimed in claim 2 in which the means for charging the capacitor comprises a source of current which is variable in accordance with the magnitude only of the said input signal.

4. A system as claimed in claim 2 in which the said signal converting means includes a trigger circuit energized by the signal across the capacitor.

5. A system as claimed in claim 2 in which the said signal converting means includes a pulse shaping circuit.

6. A system as claimed in claim 5 in which the output from the said pulse shaping circuit is a train of pulses of constant width.

7. A system as claimed in claim 1 in which the said logic means comprises a pair of NOR gates each having as one input a pulse train supplied from the firing circuit, one of the said NOR gates having an input from the switching circuit and the other of the NOR gates having an input formed by an output of the said one NOR gate, and a bistable circuit having as its inputs the outputs of the NOR gates.

8. A system as claimed in claim 7 in which the said pulse train from the firing circuit is obtained from the output of the trigger circuit.

9. A system as claimed in claim 7 in which the said pulse from the firing circuit is obtained from the pulse shaping circuit.

10. A system as claimed in claim 1 in which the signal supplied to the gate circuits is delayed by the electronic logic means for a period equal to the interval in the pulse train from the firing circuit.